United States Patent
Oliver et al.

(10) Patent No.: US 7,163,478 B2
(45) Date of Patent: *Jan. 16, 2007

(54) BELT TENSIONER HAVING AN AUTOMATICALLY ADJUSTABLE TRAVEL STOP

(75) Inventors: Larry R. Oliver, Ozark, MO (US); Richard J. Meckstroth, Vonore, TN (US); Joseph W. Zamm, Rochester, MI (US)

(73) Assignee: Dayco Products, LLC, Miamisburg, OH (US)

( * ) Notice: Subject to any disclaimer, the term of this patent is extended or adjusted under 35 U.S.C. 154(b) by 182 days.

This patent is subject to a terminal disclaimer.

(21) Appl. No.: 10/421,046

(22) Filed: Apr. 23, 2003

(65) Prior Publication Data

US 2003/0216203 A1 Nov. 20, 2003

Related U.S. Application Data

(63) Continuation-in-part of application No. 10/015,493, filed on Dec. 12, 2001, now Pat. No. 6,689,001.

(51) Int. Cl.
*F16H 7/08* (2006.01)
(52) U.S. Cl. ..................................... 474/133
(58) Field of Classification Search ................ 474/109, 474/111, 117, 133, 134, 135
See application file for complete search history.

(56) References Cited

U.S. PATENT DOCUMENTS

| 4,416,647 A | 11/1983 | White, Jr. |
| 5,575,727 A * | 11/1996 | Gardner et al. ............. 474/135 |
| 5,591,094 A * | 1/1997 | Farmer et al. .............. 474/117 |
| 6,689,001 B1 * | 2/2004 | Oliver et al. ............... 474/134 |

FOREIGN PATENT DOCUMENTS

| DE | 19926612 A1 | 12/2000 |
| WO | WO 00/77421 A1 | 12/2000 |
| WO | WO 00/77422 A1 | 12/2000 |

* cited by examiner

*Primary Examiner*—Vicky A. Johnson
(74) *Attorney, Agent, or Firm*—Joseph V. Tassone; Thompson Hine LLP

(57) ABSTRACT

A tensioner for generating tension in a power-transmitting belt is provided. The tensioner includes a base, which may be secured to an engine, and an arm that is movably attached to the base. A pulley is rotatably attached to the arm for engaging the belt. A spring is operatively connected to the arm and the base for urging the arm to move relative to the base in a first direction. When the arm is moved in the first direction, the pulley is moved into engagement with the belt with a force to tension the belt. The tensioner further includes a stop that is adjustably positioned on the base to limit the movement of the arm in a second direction. The position of the stop on the base may be automatically adjusted by the spring during installation of the tensioner.

44 Claims, 9 Drawing Sheets

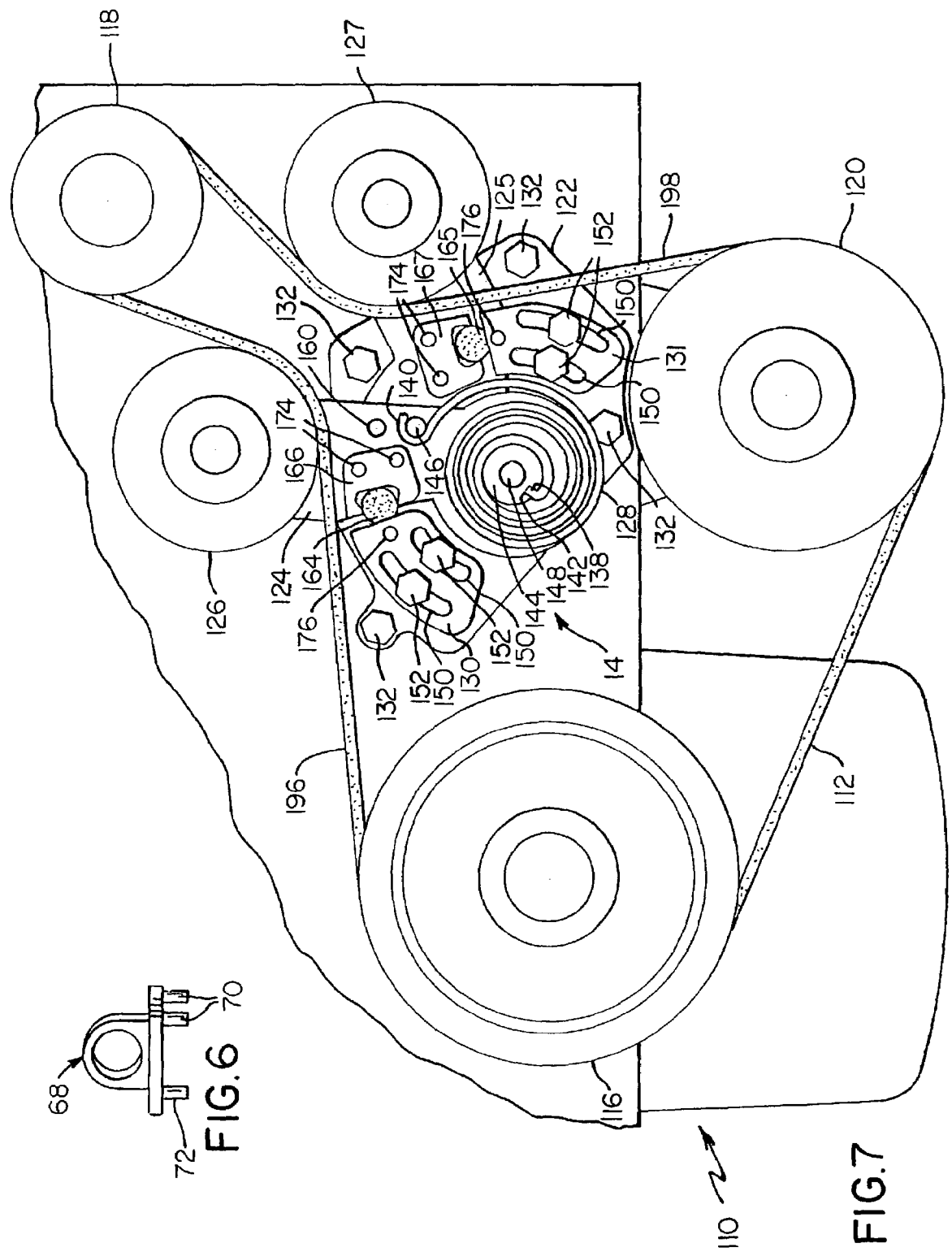

BELT TENSIONER HAVING AN AUTOMATICALLY ADJUSTABLE TRAVEL STOP

CROSS REFERENCE TO RELATED APPLICATIONS

This application is a continuation-in-part of application Ser. No. 10/015,493, filed on Dec. 12, 2001 now U.S. Pat. No. 6,689,001.

TECHNICAL FIELD

The present application relates generally to a tensioner for generating tension in a power-transmitting belt, and more particularly, to a tensioner having a travel stop that is automatically positioned by a tensioner spring during installation.

BACKGROUND

In an engine, such as an automobile engine, power may be transmitted from the engine crankshaft to one or more accessories using an endless polymeric belt. The accessories may include, for example, an alternator, an alternator/starter, a compressor, and a power steering device. The belt may be driven by a driving sheave connected to the engine crankshaft and drive one or more driven sheaves connected to one or more accessories. When the engine crankshaft experiences rapid acceleration or deceleration, or when any driven accessory is suddenly loaded or unloaded as a result of, for example, mechanical failure, it may be difficult to maintain tension in the power-transmitting belt so as to avoid slip between the belt and the sheaves. Accordingly, a variety of belt tensioners have been proposed for maintaining the required tension in the power-transmitting belt even during non-steady-state or transient conditions. One such tensioner is disclosed in U.S. Pat. No. 4,416,647. This reference is incorporated herein by reference.

For most operating conditions the best location for a tensioner in a belt-driven accessory drive system is in the "slack span" which is located between the crankshaft sheave, which ordinarily drives the system, and a first driven accessory sheave. Under certain operating conditions, however, this location of the tensioner is not the optimal location for maintaining tension in the belt. For example, during a rapid deceleration of the crankshaft driving sheave, such as occurs during a shift from first to second gear at wide open throttle, the crankshaft sheave behaves like a driven sheave and the accessory sheave, as a result of its rotational momentum, behaves like a driving sheave. In this condition the tension in the "slack span" of the belt will rapidly increase causing the belt to lift a belt-engaging pulley of the tensioner. Lifting of the tensioner pulley is a common problem that results in slack in the belt elsewhere in the system. Specifically, when the tension in the "slack span" rapidly increases as a result of engine operating conditions, the belt may lift the tensioner pulley thereby allowing the length of the belt in the "slack span" to rapidly decrease. As a result of this change, the length of the belt in another span, referred to here as the "transient slack span," may rapidly increase resulting in a sudden drop in tension and the possibility of slippage.

Accordingly, a tensioner is desired that is capable of resisting or compensating for lifting of the tensioner pulley in the "slack span" during transient operating conditions of the engine.

SUMMARY

In a first aspect, a tensioner for generating tension in a power-transmitting belt is provided. The tensioner includes a base, which may be secured to an engine, and an arm that is movably attached to the base. A pulley is rotatably attached to the arm for engaging the belt. A spring is operatively connected to the arm and the base for urging the arm to move relative to the base in a first direction. When the arm is moved in the first direction, the pulley is moved into engagement with the belt with a force to tension the belt. The tensioner further includes a stop that is linked to the arm such that the stop is automatically positioned on the base by the spring and the arm during installation of the tensioner. Upon installation the stop is positioned on the base to limit the movement of the arm in a second direction. The stop may be linked to the arm using a removable link to position the stop relative to the arm.

In a second aspect, a method of installing a tensioner is provided. The tensioner is used for generating tension in a power-transmitting belt as the belt traverses a first sheave and a second sheave and includes a base, a spring-biased arm that is movably attached to the base, a pulley that is rotatably attached to the arm for engaging the belt, and a stop. The steps of the disclosed method include: linking the stop to the spring-biased arm for movement therewith, the stop thereby being located in a predetermined position relative to the arm; securing the base relative to the first sheave and the second sheave; while the stop is linked to the arm, moving the pulley relative to the base and into engagement with the belt; securing the stop to the base after moving the pulley into engagement with the belt, the stop thereby positioned to limit the movement of the arm in a direction away from the belt; and releasing the stop from the arm after moving the pulley into engagement with the belt, thereby permitting movement of the arm relative to the stop.

In a third aspect, multiple-arm tensioner for generating tension in a power-transmitting belt is provided. The tensioner includes a base, which may be secured to an engine, a first arm that is movably attached to the base, and a second arm that is movably attached to the base. A first pulley is rotatably attached to the first arm for engaging a first span of the belt. A second pulley is rotatably attached to the second arm for engaging a second span of the belt. A spring is operatively connected to the first arm and the second arm for urging the first arm to move in a first direction toward the second arm. Likewise, the spring urges the second arm to move in a second direction toward the first arm. When the first arm is moved in the first direction, the first pulley is moved into engagement with the first span of the belt with a force to tension the belt. Likewise, when the second arm is moved in the second direction, the second pulley is moved into engagement with the second span of the belt with a force to tension the belt. The tensioner further includes a first stop that is linked to the first arm such that the first stop is automatically positioned by the spring and the first arm during installation of the tensioner. Upon installation the first stop is positioned on the base to limit the movement of the first arm in the second direction. Likewise, the tensioner includes a second stop that is linked to the second arm such that the second stop is automatically positioned on the base by the spring and the second arm during installation of the tensioner. Upon installation the second stop is positioned on the base to limit the movement of the second arm in the first direction. The first and second stops may be linked to the first and second arms respectively using removable links to position the stops relative to the arms.

In a fourth aspect, a method of installing a multiple-arm tensioner is provided. The tensioner is used for generating tension in a power-transmitting belt as it traverses a first sheave and a second sheave and includes a base, a first spring-biased arm that is movably attached to the base, a second spring-biased arm that is movably attached to the base, a first pulley that is rotatably attached to the first arm for engaging a first span of the belt, a second pulley that is rotatably attached to the second arm for engaging a second span of the belt, a first stop and a second stop. The steps of the of the disclosed method include: linking the first stop to the spring-biased first arm for movement therewith, the first stop thereby being located in a predetermined position relative to the first arm; linking the second stop to the spring-biased second arm for movement therewith, the second stop thereby being located in a predetermined position relative to the second arm; securing the base relative to the first sheave and the second sheave; while the first stop is linked to the first arm, moving the first pulley relative to the base and into engagement with the first span of the; while the second stop is linked to the second arm, moving the second pulley relative to the base and into engagement with the second span of the belt; securing the first stop to the base after moving the first pulley into engagement with the belt, the first stop thereby positioned to limit the movement of the first arm in a direction away from the second arm; securing the second stop to the base after moving the second pulley into engagement with the belt, the second stop thereby positioned to limit the movement of the second arm in a direction away from the first arm; releasing the first stop from the first arm after moving the first pulley into engagement with the first span of the belt thereby permitting movement of the first arm relative to the first stop; and releasing the second stop from the second arm after moving the second pulley into engagement with second span of the belt thereby permitting movement of the second arm relative to the second stop.

BRIEF DESCRIPTION OF THE DRAWINGS

FIG. 6 is a perspective view of a removable link according to one aspect;

FIG. 7 is a front view of a section of an automobile engine having a tensioner according to a third aspect that may be used to generate tension in a power-transmitting belt;

DETAILED DESCRIPTION

Figure 1:
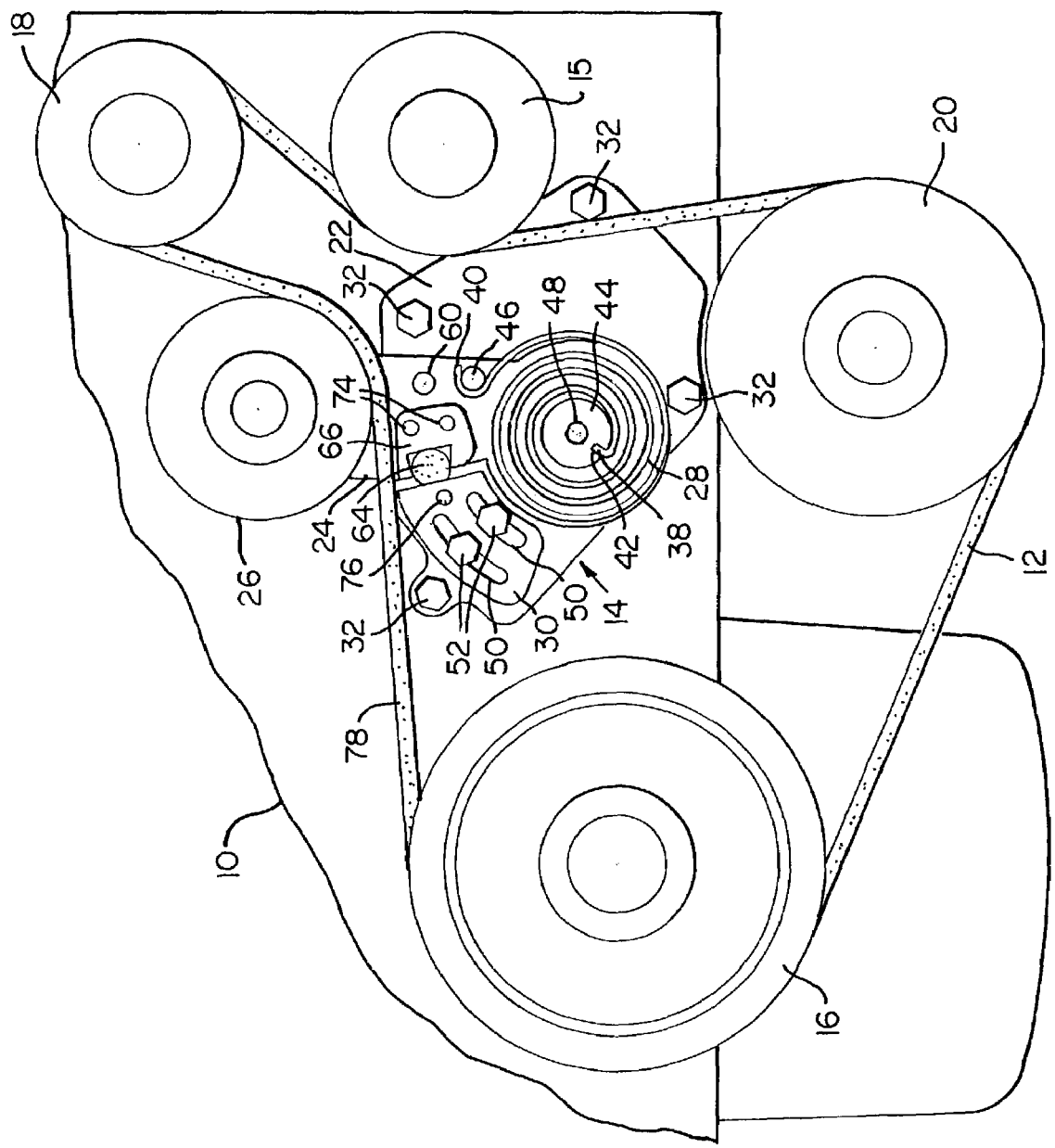
FIG. 1 is a front view of a section of an engine having a tensioner according to a first aspect that may be used to generate tension in a power-transmitting belt.

FIG. 1 illustrates a front end of an engine 10, which may be an automobile engine. The engine utilizes an endless power-transmitting belt 12 for driving at least one driven accessory, and a tensioner 14 for generating and maintaining tension in the belt 12. The engine 10 may also use an idler pulley 15 in cooperation with the tensioner 14. In addition to tensioning the belt 12, the tensioner 14 may also be capable of dampening vibrations in the belt 12.

The power-transmitting belt 12 may be made primarily of polymeric material and may be a V-belt, a flat belt, a V-ribbed belt, or any other belt suitable for transmitting power. The belt 12 may be driven by a driving sheave 16 during normal operating conditions, the driving sheave 16 having an outer surface to receive the belt 12. The driving sheave 16 may be operatively connected to the crankshaft (not shown) which may be driven by the engine 10. Through the use of the belt 12, the driving sheave 16 may drive, thereby supplying power to, one or more driven sheaves that may be operatively connected to one or more accessories. For example, in FIG. 1, the belt 12 may be used to drive a first driven sheave 18 and a second driven sheave 20. The first driven sheave 18 may be connected to an alternator/starter device (not shown). The second driven sheave 20 may be connected to a power steering device (not shown). The driven accessories, through their sheaves, may impose a load on the belt 12.

Figure 4:
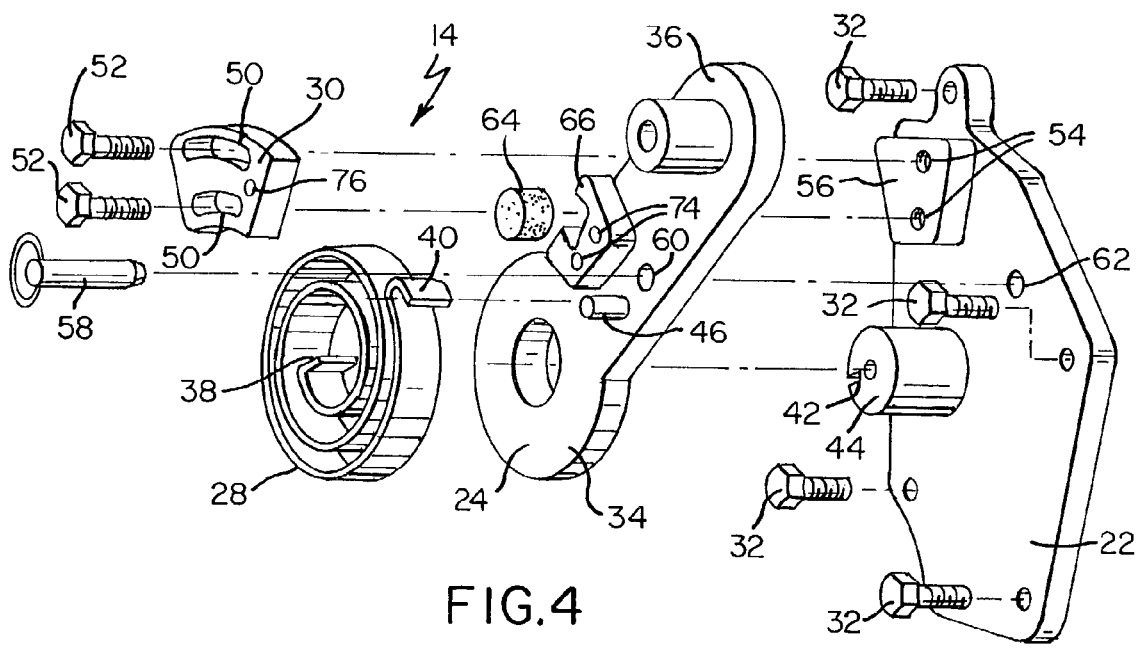
FIG. 4 is an exploded view of the tensioner of FIG. 1.

Referring to FIGS. 1 and 4, the tensioner 14 includes a base 22, an arm 24 that is movably attached to the base 22, a pulley 26 that is rotatably attached to the arm 24 for engaging the belt 12, a spring 28 that is operatively connected to the arm 24 and the base 22 for urging the arm 24 to move relative to the base 22 in a first direction (which is clockwise in FIG. 1), and a stop 30 that is linked to the arm 24 such that the stop 30 is automatically positioned on the base 22 by the spring 28 and the arm 24 during installation of the tensioner 14. Upon installation, the stop 30 is positioned on the base 22 to limit the movement of the arm 24 in a second direction (which is counterclockwise in FIG. 1).

The base 22, which may be made from cast iron, steel, or die cast aluminum, may be secured to the engine 10 in a desired position relative to the driving sheave 16 and the driven sheave 18 with bolts 32 or other fasteners. Specifically, the base 22 may be secured to the engine 10 in a position such that the belt 12 may be tensioned by the tensioner 14 in a span located between the driving sheave 16 and the driven sheave 18, also referred to here as the "slack span" 78.

The arm 24, which may be made from cast iron or steel, may be attached to the base 22 for pivotable movement. As illustrated in FIG. 1, the arm 24 may be attached to the base 22 at a first end 34 of the arm 24 and the pulley 26, which may be made from hard plastic or spun steel, may be rotatably attached to a second end 36 of the arm 24. Accordingly, as the arm 24 is pivoted on the base 22 by the spring 28, the pulley 26 may engage the belt 12 with a force to tension the belt 12.

Figure 2:
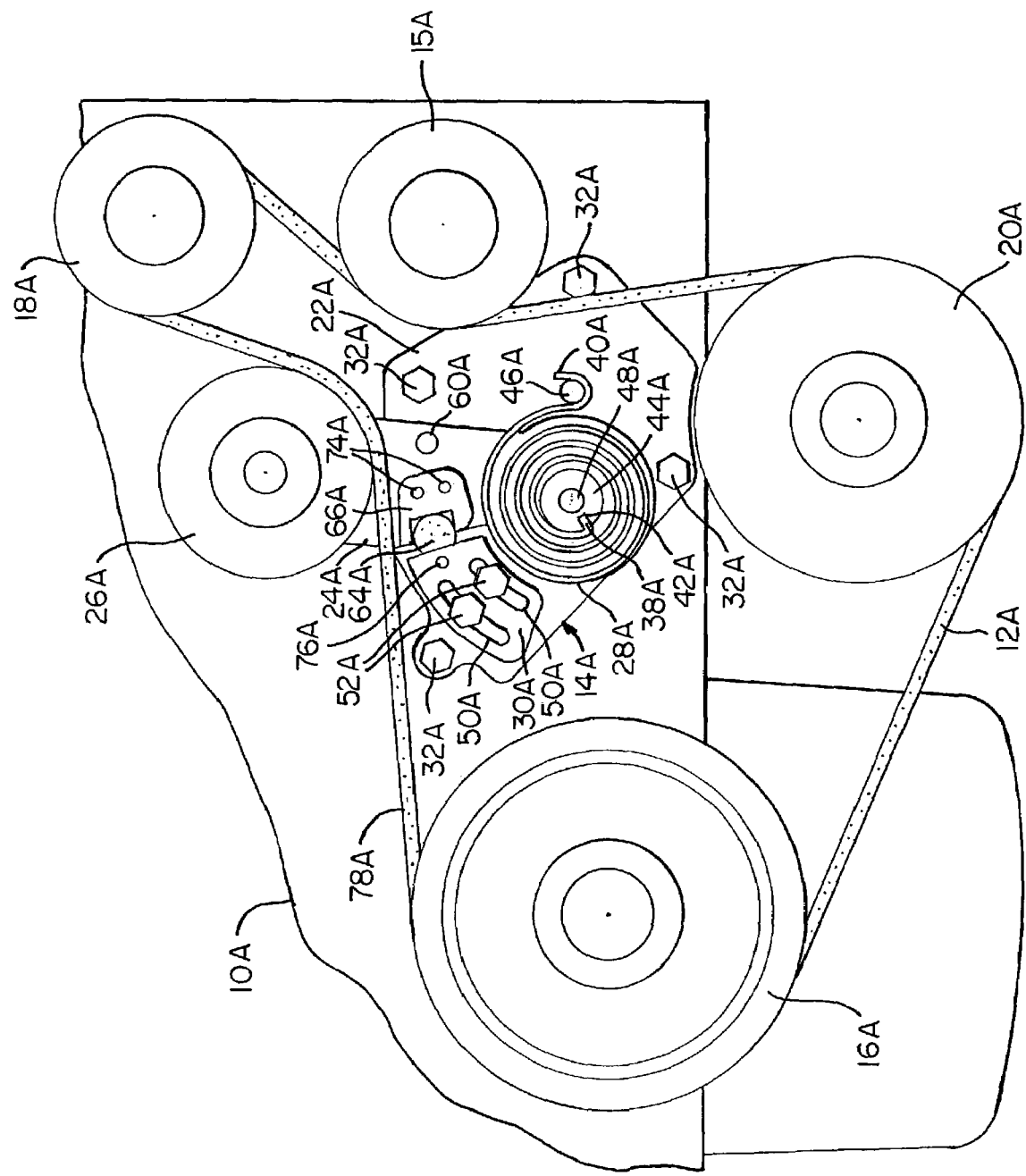
FIG. 2 is a front view of a section of an engine having a tensioner according to a second aspect that may be used to generate tension in power-transmitting belt.
Figure 3:
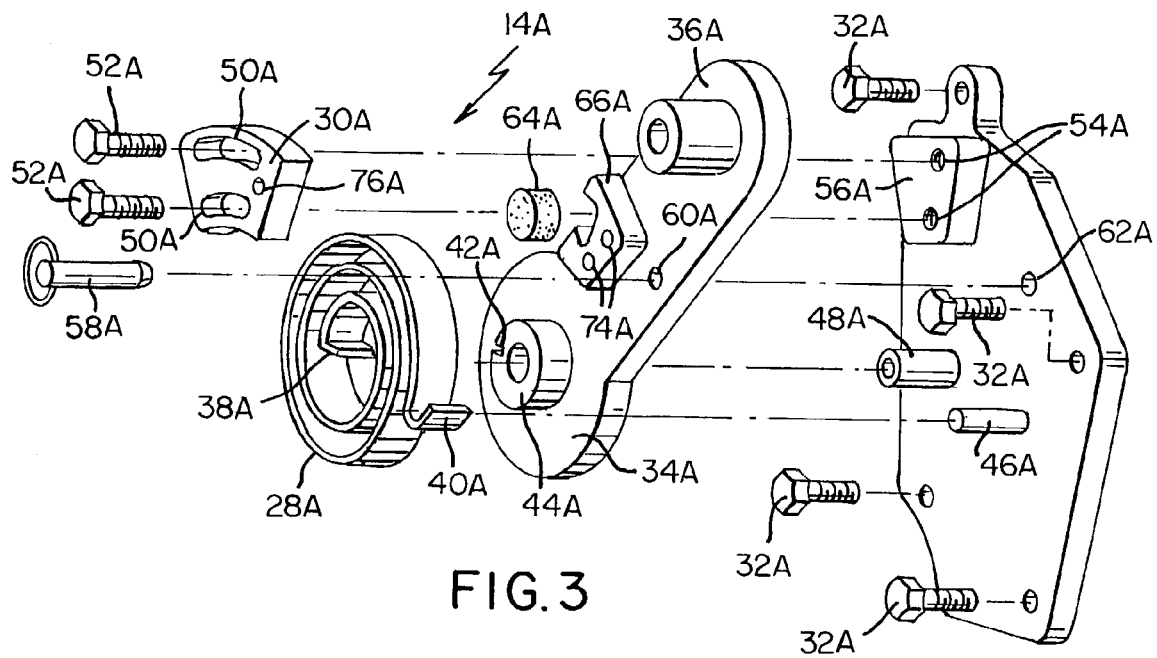
FIG. 3 is an exploded view of the tensioner of FIG. 2.

The spring 28, which may be a spiral spring (as shown), a helical tension spring, a helical compression spring, or other type of spring, is operatively connected to the arm 24 and the base 22 for urging the arm 24 to move in a first direction relative to the base 22. As illustrated in FIGS. 1 and 4, a first end 38 of the of the spring 28 may be received in a slot 42 in a hub 44 extending from the base 22 through an opening in the arm 24. A second end 40 of the spring 28 may engage a protrusion 46 extending from the arm 24. In this configuration, the unwinding of the spring 28 may cause the arm 24 to pivot in the first direction about the hub 44 of the base 22 onto which the arm 24 is received. In another aspect, illustrated in FIGS. 2 and 3, in a tensioner 14A having similar elements to the tensioner 14, but with the designation A, the spring 28A may be a spiral spring, having a first end 38A which is received in a slot 42A in a protrusion 44A extending from the arm 24A and a second end 40A which engages a protrusion 46A extending from the base 22A. In this configuration, the spring 28A causes the arm 24A to pivot about a shaft 48A on the base 22A onto which the arm 24A is received.

The stop 30, which may be made from cast iron or steel, may include at least one slot 50 therethrough for receiving at least one retaining bolt 52. As shown in FIGS. 1 and 4 the stop 30 may include two slots 50 for receiving two retaining bolts 52, one retaining bolt 52 per slot 50. During installation the retaining bolts 52 are loose to permit sliding of the stop 30 relative to the base 22 and the retaining bolts 52. Specifically, the retaining bolts 52 may be passed through slots 50 and loosely threaded into corresponding threaded holes 54 in the base 22. When loose, the retaining bolts 52 loosely hold the stop 30 onto the base 22 but permit the stop 30 to slide into a desired position during installation. Once the stop 30 is properly positioned by the movement of the arm 24, the retaining bolts 52 are tightened to secure the stop 30 to the base 22 thereby preventing further movement of the stop 30 relative to the base 22. The threaded holes 54 in the base 22 may be located in a raised region 56 which is sized to position the stop 30 for interaction with the arm 24 when the arm 24 is moved relative to the base 22. The stop 30 may act as a maximum travel stop to limit the movement of the arm 24 in a second direction (which is counterclockwise in FIG. 1). Specifically, the stop 30 may be positioned so as to permit the belt 12 to lift the pulley 26 of the tensioner 14 only a small predetermined amount away from a static equilibrium position of the pulley 26.

In another aspect, the tensioner 14 may include a locking member 58. As shown in FIG. 4 the locking member 58 may be a substantially cylindrical pin. The arm 24 may include an aperture 60 for receiving the locking member 58. Likewise, the base 22 may including an aperture 62 for receiving the locking member 58. When the aperture 60 of the arm 24 and the aperture 62 of the base 22 are aligned, the locking member 58 may be inserted into the apertures 60, 62 to lock the arm 24 to prevent movement of the arm 24 relative to the base 22. At least one of the apertures 60, 62 may be specially positioned so that when the apertures 60, 62 are aligned, the arm 24 may be locked in a desired position for easy installation of the tensioner 14. When the arm 24 is locked, usually during assembly by the manufacturer, the spring 28 may be in a preloaded condition. During installation of the tensioner 14, the locking member 58 may be removed from the apertures 60, 62, thereby unlocking the arm 24 from the base 22 and permitting movement of the arm 24 relative to the base 22.

In another aspect, the tensioner 14 may include a bushing 64 located between the arm 24 and the stop 30 for resisting the movement of the arm 24 in the second direction. Specifically, the bushing 64 may be positioned, as illustrated in FIG. 1, so that movement of the arm 24 in the second direction will cause the bushing 64 to be compressed between the arm 24 and the stop 30. When the bushing 64 is compressed it may exert a resistive force opposing movement of the arm 24 in the second direction. The bushing 64 may be made of hard rubber with approximately a 90 dermometer and may possess a non-linear spring rate.

In an aspect including the bushing 64 the tensioner 14 may provide a non-linear or dual resistance to movement of the arm 24 in the second direction. A first range of resistance force, which occurs over a first range of movement of the arm 24 when the bushing 64 is not compressed, may be generated only by the spring 28. A second range of resistance force, which occurs over a second range of movement of the arm 24 when the bushing 64 is compressed, may be generated by the spring 28 and the bushing 64. One advantage of a tensioner 14 having a dual or non-linear resistance is that resonant vibrations may be reduced. Specifically, while movement of the arm 24 in the first direction may be governed only by the spring 28 which possesses a first spring rate, movement of the arm 24 in the second direction, depending upon the arm position, may be governed by both the spring 28 and the bushing 64 which together possess a second spring rate. Because resonance requires a single, continuous spring rate, the aspect of the tensioner 14 herein described may dampen resonant vibrations as the arm 24 oscillates between the first spring rate and the second spring rate.

As shown in FIGS. 1 and 4, the arm 24 of the tensioner 14 may include a reaction pad 66 that is positioned on the arm 24 to interact with the stop 30 to limit the movement of the arm 24 in the second direction. Referring to FIG. 1, if the arm 24 is attached to the base 22 for pivotable movement, the stop 30 and the reaction pad 66 may be positioned at approximately the same distance or radius from the pivot point of the arm 24 so that the stop 30 interferes with the pivotable movement of the reaction pad 66 on the arm 24. In this manner, the interaction of the stop 30 and the reaction pad 66 may define a maximum travel limit of the arm 24 in the second direction. The reaction pad 66 may be made from cast iron or steel.

In another aspect, the reaction pad 66 may be shaped to receive the bushing 64 and hold the bushing 64 between the stop 30 and the reaction pad 66. As shown in FIG. 1, a portion of the bushing 64 may protrude from the reaction pad 66 so that the stop 30 and the reaction pad 66 cannot contact one another until the bushing 64 has been partially compressed.

In another aspect, the tensioner 14 includes a removable link 68 for use during installation of the tensioner 14. Referring to FIG. 6, the removable link 68 may have a first protrusion 70 and a second protrusion 72. Referring to FIG. 4, the arm 24 may include a recess 74 for receiving the first protrusion 70. Similarly, the stop 30 may include a recess 76 for receiving the second protrusion 72. The recess 74 in the arm 24 may be located in the reaction pad 66 of the arm 24. As will be described in more detail below, the removable link 68 may be used in conjunction with the spring 28 during installation of the tensioner 14 to automatically adjust the position of the stop 30 on the base 22. In particular, the removable link 68 may be sized so as to position the stop 30 at a predetermined desirable distance from the arm 24 when the first protrusion 70 is received in the recess 74 in the arm 24 and the second protrusion 72 is received in the recess 76 in the stop 30.

As previously described, during rapid deceleration of the crankshaft, such as occurs during a shift from first to second gear in wide open throttle, the tension in the "slack span" 78 of the belt 12 may rapidly increase, thereby causing the belt 12 to lift the pulley 26 and the arm 24 in the second direction, away from the belt 12. As a consequence, the length of the belt 12 in the "slack span" 78 may rapidly decrease resulting in a corresponding increase in the length of the belt 12 in another span. Such an event, which is commonly associated with transient engine conditions, may lead to slippage of the belt 12 relative to a sheave or in extreme conditions complete disengagement of the belt 12 from one of the sheaves. Accordingly, a tensioner is desired that can easily move in the first direction, toward the belt 12, to tension or take up slack in the "slack span" 78 of the belt 12, but which possesses a limited range of motion in the second direction, away from the belt, to prevent substantial shortening of the "slack span" 78 of the belt 12 relative to a static equilibrium position of the belt 12. According to an aspect of the tensioner 14 described herein, the stop 30 may be positioned on the base 22 in order to limit the movement of the arm 24 in the second direction. Specifically, the stop 30 may be positioned so that a maximum travel position of the arm 24 in the second direction is as close as possible to the static equilibrium position of the arm 24. In this manner the tensioner 14 may limit lifting of the arm 24 in the second direction and corresponding shorting of the belt 12 in the "slack span" 78. By contrast, the movement of the arm 24 in the first direction may be limited only by the range of motion of the spring 28.

In another aspect, a method of installing a tensioner is provided. The method may be used to install a tensioner for generating tension in power-transmitting belt as the belt traverses a first sheave and a second sheave, the tensioner having a base, a spring-biased arm movably attached to the base, a pulley rotatably attached to the arm for engaging the belt, and a stop. The method may be used to install the tensioner 14 shown in FIGS. 1–5. Accordingly, for the purpose of describing the method of assembly, reference will be made to the tensioner 14 described and illustrated herein. References to the particular components shown in FIGS. 1–5 are not intended to limit the scope of the disclosed method.

One advantage of the described method is that a position of the stop 30 relative to the base 22 may be automatically adjusted during installation so as to set a desired travel limit for the arm 24 in a direction away from the belt. In order to accomplish automatic adjustment of the stop position the method of installation may include the following steps.

Figure 5:
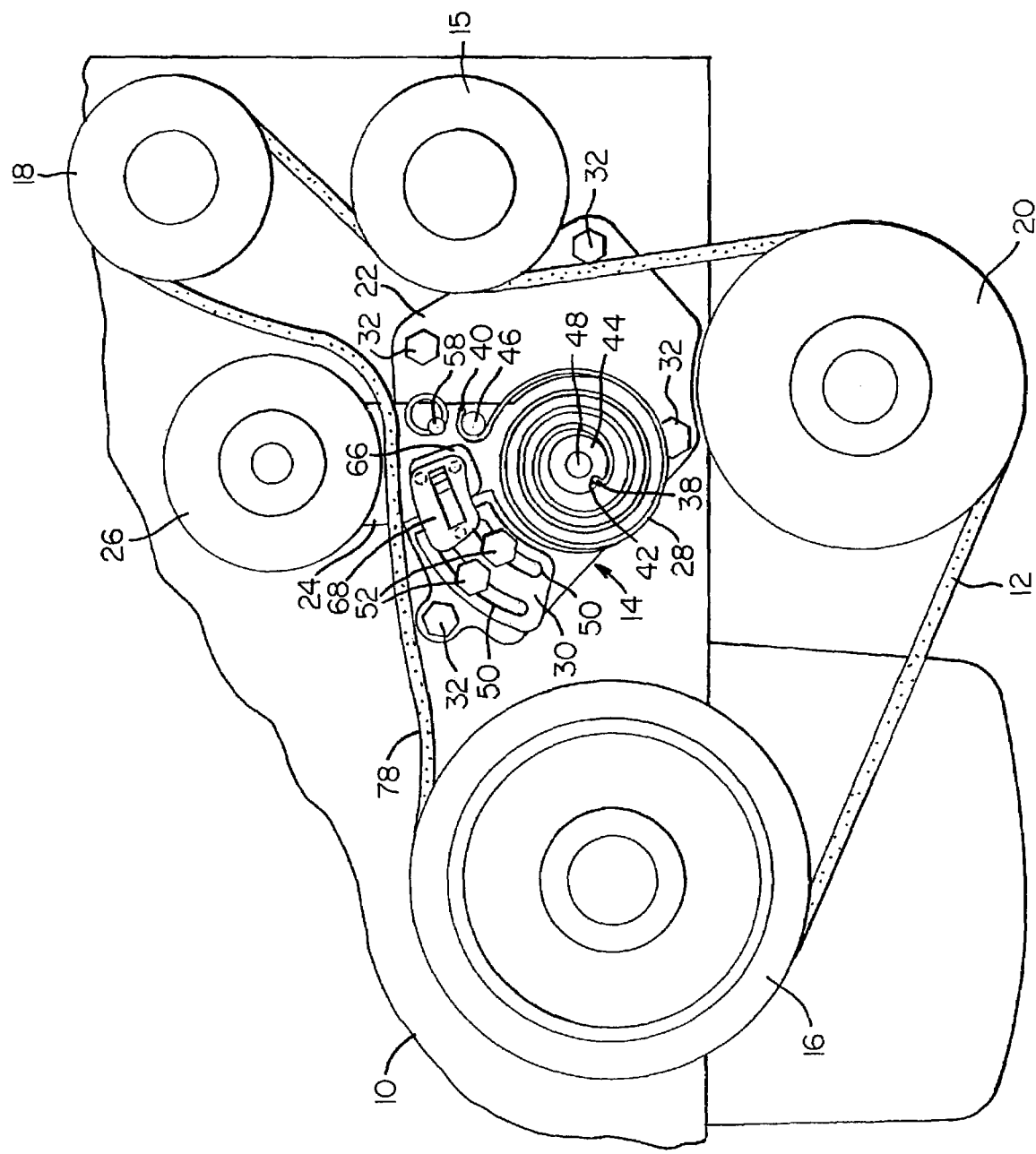
FIG. 5 is a front view of a section of an engine having the tensioner of FIG. 1 in a pre-installed state wherein the belt is untensioned.

Referring to FIG. 5, which depicts a tensioner 14 during installation before the belt 12 is tensioned, the stop 30 is linked to the arm 24 for movement therewith. Specifically, the stop 30 may be linked to the arm 24 using the removable link 68, thereby securing the stop 30 in predetermined position relative to the arm 24. As described herein the removable link 68 may have a first protrusion 70 which is received in a recess 74 in the arm 24 and a second protrusion 72 which is received in a recess 76 in the stop 30. Additionally, the removable link 68 is sized so as to position the stop 30 at a predetermined desirable distance from the arm 24 when the first protrusion 70 is received in the recess 74 in the arm 24 and the second protrusion 72 is received in the recess 76 in the stop 30. The step of linking the stop 30 to the arm 24 may be performed during assembly by a manufacturer before shipment of the tensioner 14 to an installer.

In another step, the base 22 may be secured relative to the first sheave, which may be the driving sheave 16, and the second sheave, which may be the first driven sheave 18. In particular, the base 22 may be secured to the engine 10 using bolts 32 in a position such that the tensioner 14 may tension the belt 12 in a span located between the first sheave 16 and the second sheave 18.

While the stop 30 is linked to the arm 24, the pulley 26 may be moved relative to the base 22 and into engagement with the belt 12. This step may require the installer to align the belt with the pulley 26. As a result of spring-biasing, the arm 24, to which the pulley 26 is attached, may exert a force on the belt 12 through the pulley 26 to generate a static tension in the belt 12. When the pulley 26 and arm 24 are generating a static tension in the belt 12 the arm 24 is in a static equilibrium position, the location of which may be set by the spring 28. As a result of having been linked to the arm 24 in a previous step, the stop 30 is automatically located in a predetermined position relative to the static equilibrium position of the arm upon moving the pulley 26 relative to the base 22 into engagement with the belt 12. Accordingly, the position of the stop 30 on the base 22 may be automatically adjusted to a desired position by the spring 28 during installation.

After moving the pulley 26 into engagement with the belt 12, the stop 30 may be secured to the base 22. Referring to FIG. 1 the stop 30 may be secured to the base 22 using one or more retaining bolts 52. As previously described, the spring 28, which biases the arm 24 in a first direction, may automatically set the static equilibrium position of the arm when the pulley 26 is engaged with the belt 12. Moreover, as a result of the stop 30 having been linked to the arm 24, the spring 28 may simultaneously adjust the position of the stop 30 when the pulley 26 is engaged with the belt 12. Accordingly, upon engaging the pulley 26 with the belt 12, the stop 30 is automatically positioned in a desired location and may be secured to the base 22 to limit the movement of the arm 24 in a direction away from the belt 12.

In another step, after moving the pulley 26 into engagement with the belt 12, the stop 30 may be released from the arm 24 by removing the link 68, thereby permitting movement of the arm 24 relative to the stop 30. The stop 30 may be released from the arm 24 either before or after the stop 30 is secured to the base 22 provided that the stop 30 is not otherwise moved after its position has been automatically set by the spring 28. The stop 30 may be released by removing the removable link 68.

In another aspect, the method may also include the following additional steps. Referring to FIG. 5, before securing the base 22 relative to the first sheave 16 and the second sheave 18, the arm 24 may be locked to prevent movement of the arm 24 relative to the base 22. This step may be performed by the manufacturer before shipment of the tensioner 14 to the installer. The arm 24 may be locked by inserting a locking member 58 through an aperture 60 in the arm 24 and into an aligned aperture 62 in the base 22. At least one of the aperture 60 in the arm 24 and the aperture 62 in the base 22 may be specially positioned so that when the apertures 60, 62 are aligned and the locking member 58 is received in the apertures 60, 62, the arm 24 will be locked in a predetermined position to allow for easy installation. Specifically, the arm 24 may be locked in a position such that when the base 22 is secured to the engine 10, the belt may be easily moved or aligned for engagement with the first sheave 16, the second sheave 18, and the pulley 26. Before moving the pulley 26 relative to the base 22 to tension the belt 12, the arm 24 may be unlocked by removing the locking member 58 from at least one of the apertures 60, 62.

Referring to FIG. 7, in another aspect a multiple-arm tensioner 114 is provided for generating and maintaining tension in a power-transmitting belt 112 as the belt 112 traverses at least a first sheave and a second sheave of an engine 110. The belt 112 may be driven by a driving sheave 116 which may be operatively connected to a crankshaft (not shown) of the engine 110. Through the use of the belt 112, the driving sheave 116 may drive, thereby supplying power to, one or more driven sheaves that may be operatively connected to one or more accessories. For example, as shown in FIG. 7, the belt 112 may be used to drive a first driven sheave 118 and a second driven sheave 120. The first driven sheave 118 may be connected to an alternator/starter device (not shown). The second driven sheave 120 may be connected to a power steering device (not shown). The driven accessories, through their sheaves, may impose a load on the belt 112.

Figure 8:
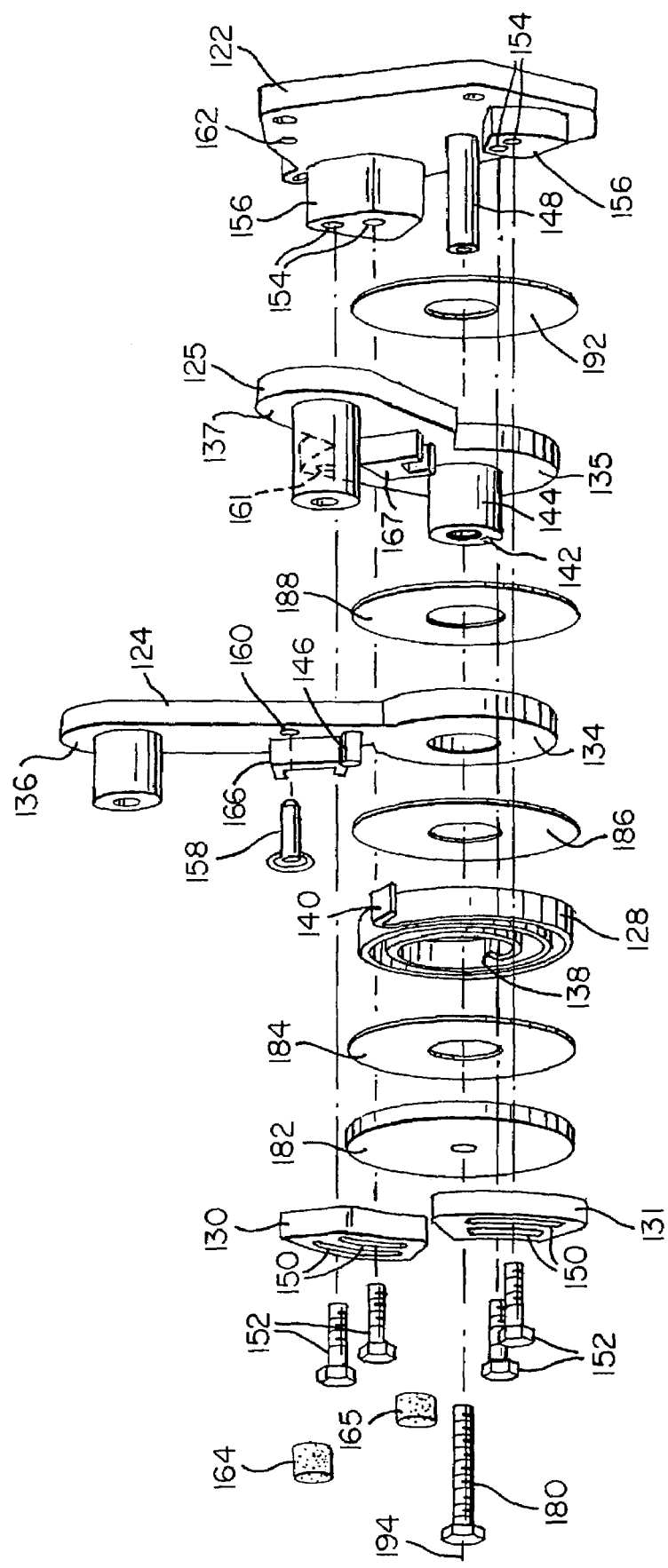
FIG. 8 is an exploded view the tensioner according to a fourth aspect.

Referring to FIGS. 7 and 8, the tensioner 114 may include a base 122, a first arm 124 that is movably attached to the base 122, a second arm 125 that is movably attached to the base 122, a first pulley 126 that is rotatably attached to the first arm 124 for engaging a first span 196 of the belt 112, a second pulley 127 that is rotatably attached to the second arm 125 for engaging a second span 198 of the belt 112, a spring 128 that is operatively connected to the first arm 124 and the second arm 125 for urging the first arm 124 to move relative to the base 122 in a first direction (which is clockwise in FIG. 7) toward the second arm 125 and urging the second arm 125 to move in a second direction (which is counterclockwise in FIG. 7) toward the first arm 124, a first stop 130 that is positioned on the base 122 to limit the movement of the first arm 124 in the second direction, away from the second arm 125, and a second stop 131 that is positioned on the base 122 to limit the movement of the second arm 125 in the first direction away from the first arm 124. The first stop 130 may be linked to the first arm 124 such that the first stop 130 is automatically positioned on the base 122 by the spring 128 and the first arm 124 during installation of the tensioner 114. Likewise, the second stop may be linked to the second arm 125 such that the second stop 131 is automatically positioned on the base 122 by the spring 128 and the second arm 125 during installation of the tensioner 114.

The base 122 may be secured to the engine 110 in a desired position relative to the driving sheave 116 and the driven sheave 118 with bolts 132 or other fasteners. Specifically, the base 122 may be secured to the engine 110 in a position such that the belt 112 may be tensioned by the tensioner 114 in a first span 196 located between the driving sheave 116 and the first driven sheave 118 and a second span 198 located between the driven sheave 118 and the second driven sheave 120. In an engine that does not include more than one driven accessory, the second span 198 of the belt 112 may be located between the first driven sheave 118 and the driving sheave 116.

The first arm 124 and second arm 125 may be attached to the base 122 for pivotable movement. As illustrated in FIG. 7, the first arm 124 may be attached to the base 122 at a first end 134 of the first arm 124 and the first pulley 126 may be rotatably attached to a second end 136 of the first arm 124. Likewise, the second arm 125 may be attached to the base 122 at a first end 135 of the second arm 125 and the second pulley 127 may be rotatably attached to a second end 137 of the second arm 125. Accordingly, as the first arm 124 and the second arm 125 are pivoted on the base 122 by the spring 128, the first pulley 126 and the second pulley 127 may engage the first span 196 and the second span 198 of the belt 112 respectively with a force to tension the belt 112.

Figure 9:
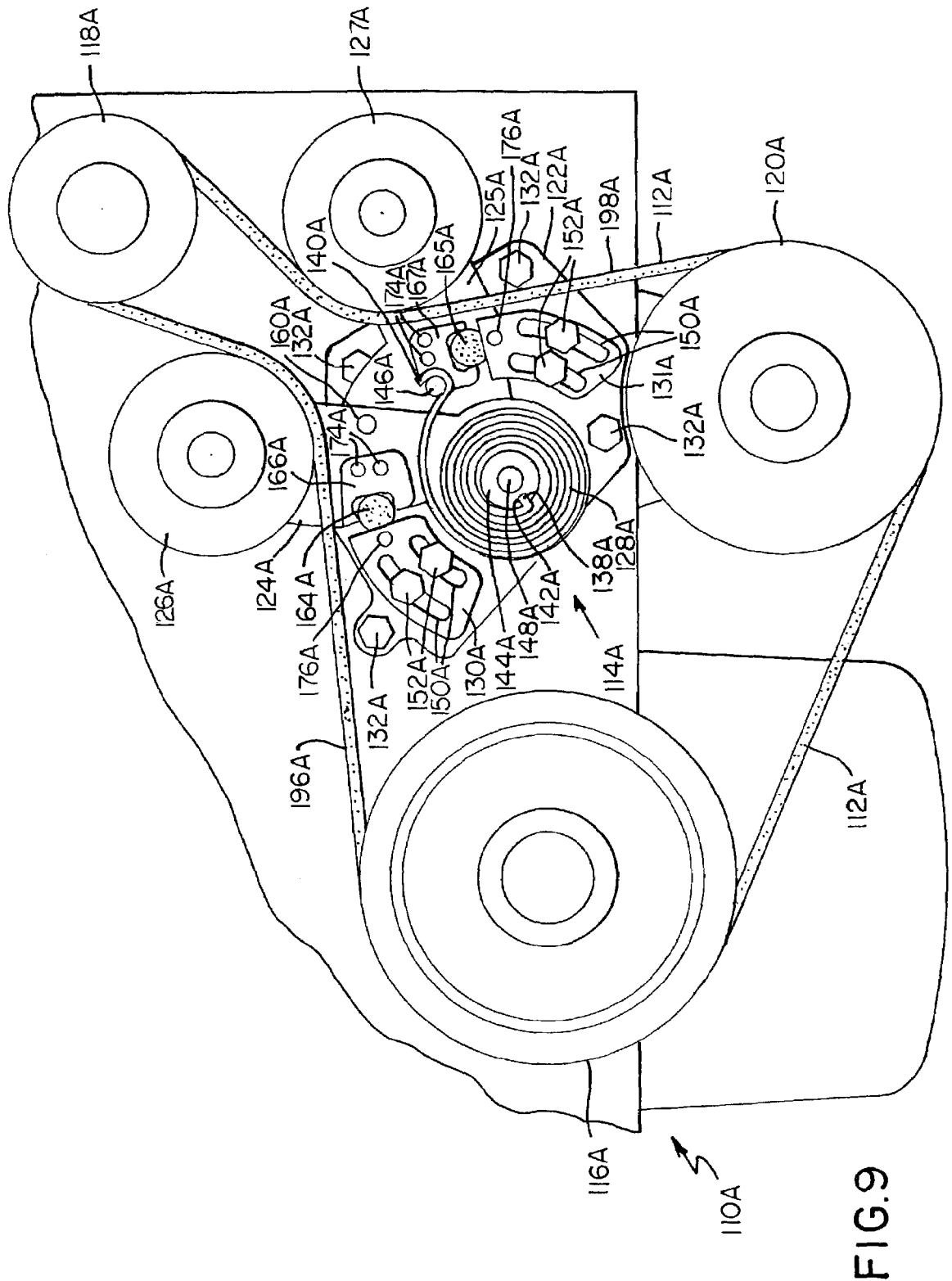
FIG. 9 is a front view of a section of an automobile engine having a tensioner according to a fifth aspect that may be used to generate tension in a power-transmitting belt.
Figure 10:
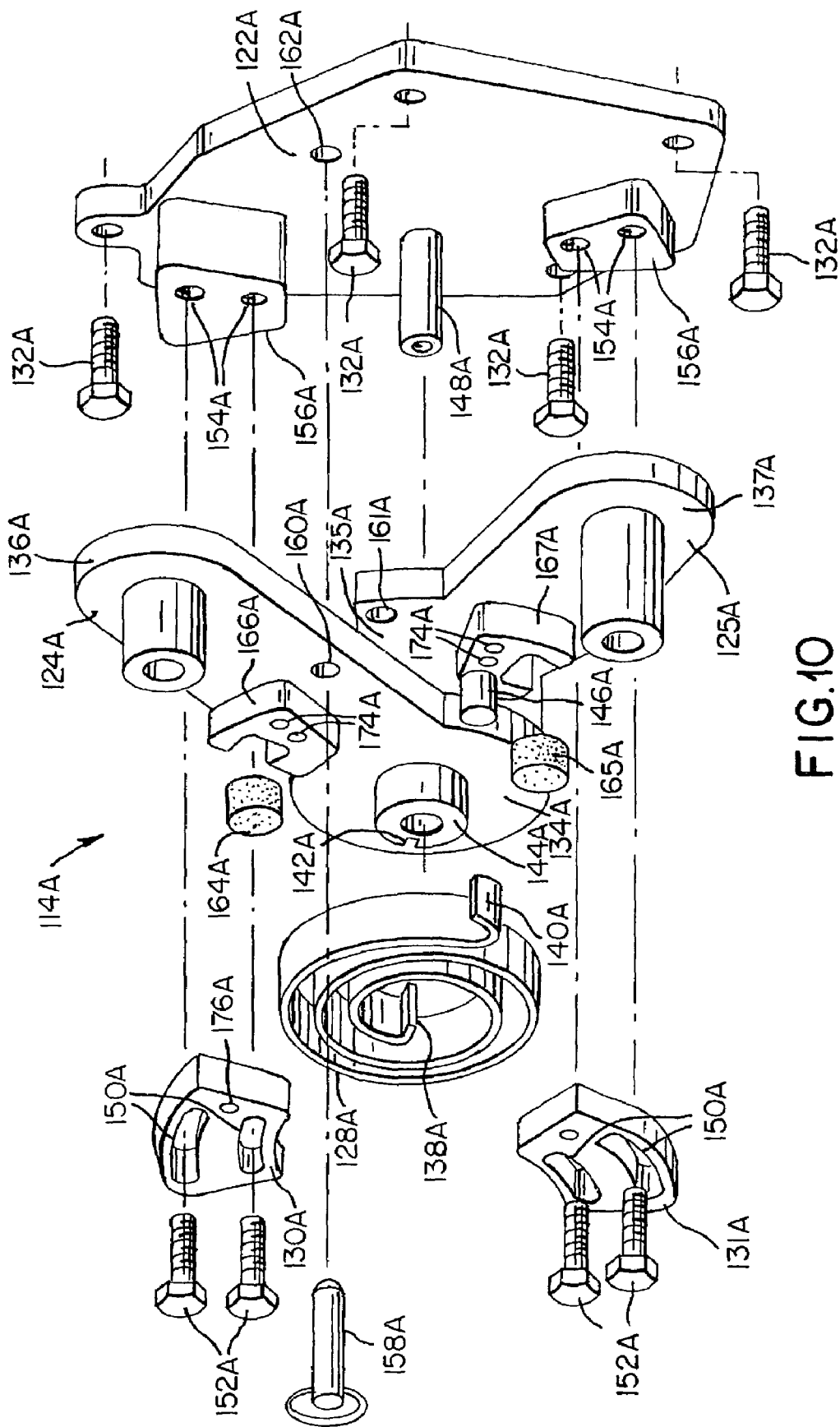
FIG. 10 is an exploded view of the tensioner of FIG. 9.

The spring 128, which may be a spiral spring (as shown), a helical tension spring, a helical compression spring, or other type of spring, is operatively connected to the first arm 124 and the second arm 125 for urging the arms 124, 125 to move relative to one another. As illustrated in FIGS. 7 and 8, a first end 138 of the of the spring 128 may be received in a slot 142 in a hub 144 extending from the second arm 125 through an opening in the first arm 124. A second end 140 of the spring 128 may engage a protrusion 146 extending from the first arm 124. In this configuration, the spring 128 may cause the first arm 124 to pivot in the first direction about the hub 144 of the second arm 125 onto which the first arm 124 is received. Likewise, the spring 128 may cause the second arm 125 to pivot in the second direction about a shaft 148 on the base 122 onto which the second arm 125 is received. In another aspect, illustrated in FIGS. 9 and 10, in a tensioner 114A having similar elements to the tensioner 114, but with the designation A, the spring 128A may be a spiral spring, having a first end 138A which may be received in a slot 142A in a protrusion 144A extending from the first arm 124A and a second end 140A which may engage a protrusion 146A extending from the second arm 125A. In this configuration, the spring 128A may cause the first arm 12A to pivot about a shaft 148A on the base 122A onto which the first arm 124A is received. Likewise, the spring 12A may cause the second arm 125A to pivot about the shaft 148A on to which the second arm is received.

The first and second stops 130, 131 may include at least one slot 150 therethrough for receiving at least one retaining bolt 152. As shown in FIGS. 7 and 8 the first and second stops 130, 131 may include two slots 150 for receiving two retaining bolts 152, one retaining bolt 152 per slot 150. During installation the retaining bolts 152 are loose to permit sliding of the first and second stops 130, 131 relative to the base 122 and the retaining bolts 152. Specifically, the retaining bolts 152 may be passed through slots 150 and loosely threaded into corresponding threaded holes 154 in the base 122. When loose, the retaining bolts 152 loosely hold the first and second stops 130, 131 onto the base 122 but permit the first and second stops 130, 131 to slide into a desired position during installation. Once the stops 130, 131 are properly positioned by the movement of the arms 124, 125, the retaining bolts 152 may be tightened to secure the first and second stops 130, 131 to the base 122 thereby preventing further movement of the stops 130, 131 relative to the base 122. The threaded holes 154 in the base 122 may be located in one or more raised regions 156 which are sized to position the stops 130, 131 for interaction with the first arm 124 and the second arm 125 respectively when the arms 124, 125 are moved relative to the base 122. The first stop 130 may act as a maximum travel stop to limit the movement of the first arm 124 in the second direction (which is counterclockwise in FIG. 7). Specifically, the first stop 130 may be positioned so as to permit the belt 112 to lift the first pulley 126 of the tensioner 114 only a small predetermined amount away from a static equilibrium position of the pulley 126. Likewise, the second stop 131 may act as a maximum travel stop to limit the movement of the second arm 125 in the first direction (which is clockwise in FIG. 7).

In another aspect, the tensioner 114 may include a locking member 158. As shown in FIG. 8 the locking member 158 may be a substantially cylindrical pin. The first arm 124 may include an aperture 160 for receiving the locking member 158 and the second arm 125 may include an aperture 161 for receiving the locking member 158. Likewise, the base 122 may including an aperture 162 for receiving the locking member 158. When the aperture 160 of the first arm 124, the aperture 161 of the second arm 125, and the aperture 162 of the base 122 are aligned, the locking member 158 may be inserted into the apertures 160, 161, 162 to lock the first arm 124 and the second arm 125 to prevent movement of the arms 124, 125 relative to the base 122. In another aspect, the locking member 158 may be inserted only into the aperture 160 in the first arm 124 and the aperture 161 in the second arm 125 to prevent movement of the first arm 124 relative to the second arm 125 but permit movement of the arms 124, 125 relative to the base 122 and into contact with the belt 112.

The apertures 160, 161 may be specially positioned so that when the apertures 160, 161 are aligned, the arms 124, 125 may be locked in a desired position for easy installation of the tensioner 114. In particular, the arms 124, 125 may be locked in an "open" position so that the first and second spans 196, 198 of the belt may be passed between the first and second pulleys 126, 127. During installation of the tensioner 114, the locking member 158 may be removed from the apertures 160, 161, thereby unlocking the arms 124, 125 and permitting movement of the arms 124, 125 relative to each other and relative to the base 122.

In another aspect, the tensioner 114 may include a first bushing 164 located between the first arm 124 and the first stop 130 for resisting the movement of the first arm 124 in the second direction and a second bushing 165 located between the second arm 125 and the second stop 131 for resisting movement of the second arm 125 in the first direction. The first bushing 164 may be positioned, as illustrated in FIG. 7, so that movement of the first arm 124 in the second direction may cause the first bushing 164 to be compressed between the first arm 124 and the first stop 130. Likewise, the second bushing 165 may be positioned so that movement of the second arm 125 in the first direction may cause the second bushing 165 to be compressed between the second arm 125 and the second stop 131. When the first bushing 164 is compressed it may exert a resistive force opposing movement of the first arm 124 in the second direction. Likewise, when the second bushing 165 is compressed it may exert a resistive force opposing movement of the second arm 125 in the first direction.

In an aspect including the first bushing 164 and the second bushing 165 the tensioner 114 may provide a non-linear or dual resistance to movement of the first arm 124 in the second direction and movement of the second arm 125 in the first direction. With respect to the first arm 124, a first range of resistance force, which occurs over a first range of movement of the first arm 124 when the first bushing 164 is not compressed, may be generated only by the spring 128. A second range of resistance force, which occurs over a second range of movement of the first arm 124 when the first bushing 164 is compressed, may be generated by the spring 128 and the first bushing 164. With respect to the second arm 125, a first range of resistance force, which occurs over a first range of movement of the second arm 125 when the second bushing 165 is not compressed, may be generated only by the spring 128. A second range of resistance force, which occurs over a second range of movement of the second arm 125 when the second bushing 165 is compressed, may be generated by the spring 128 and the second bushing 165.

As shown in FIGS. 7 and 8, the first arm 124 of the tensioner 114 may include a first reaction pad 166 that is positioned on the first arm 124 to interact with the first stop 130 to limit the movement of the first arm 124 in the second direction. Similarly, the second arm 125 may include a second reaction pad 167 that is positioned on the second arm 125 to interact with the second stop 131 to limit the movement of the second arm 125 in the first direction. Referring to FIG. 7, if the arms 124, 125 are attached to the base 122 for pivotable movement, the stops 130, 131 and the reaction pads 166, 167 may be positioned at approximately the same distance or radius from the pivot point of the arms 124, 125 so that the stops 130, 131 interfere with the pivotable movement of the reaction pads 166, 167. In this manner, the interaction of the first stop 130 and the first reaction pad 166 may define a maximum travel limit of the first arm 124 in the second direction. Likewise, the interaction of the second stop 131 and the second reaction pad 167 may define a maximum travel limit of the second arm 125 in the first direction.

In another aspect, the first and second reaction pads 166, 167 may be shaped to receive the first and second bushing 164, 165 respectively and hold the first bushing 164 between the first stop 130 and the first reaction pad 166 and the second bushing 165 between the second stop 131 and the second reaction pad 167. As shown in FIG. 7, a portion of the bushings 164, 165 may protrude from the reaction pads 166, 167 so that the stops 130, 131 and the reaction pads 166, 167 cannot contact one another until the bushings 164, 165 have been partially compressed.

In another aspect, the tensioner 114 may include removable links 68 for use during installation of the tensioner 114. Referring to FIG. 6, the removable links 68 may have a first protrusion 70 and a second protrusion 72. Referring to FIG. 7, the arms 124, 125 may include recesses 174 for receiving the first protrusion 70. Similarly, the stops 130, 131 may include recesses 176 for receiving the second protrusion 72. The recesses 174 in the arms 124, 125 may be located in the reaction pads 166, 167 of the arms 124, 125. The removable links 68 may be used in conjunction with the spring 128 during installation of the tensioner 114 to automatically adjust the position of the stops 130, 131 on the base 122. In particular, the removable links 68 may be sized so as to position the stops 130, 131 at a predetermined desirable distance from the arms 124, 125 when the first protrusions 70 are received in the recesses 174 in the arms 124, 125 and the second protrusions 72 are received in the recesses 176 in the stops 130, 131.

In another aspect, a method of installing the multiple-arm tensioner 114 is provided. One advantage of the described method is that a position of the stops 130, 131 relative to the base 122 may be automatically adjusted during installation so as to set desired travel limits for the arms 124, 125. In order to accomplish automatic adjustment of the stop positions the method of installation may include the following steps.

Figure 11:
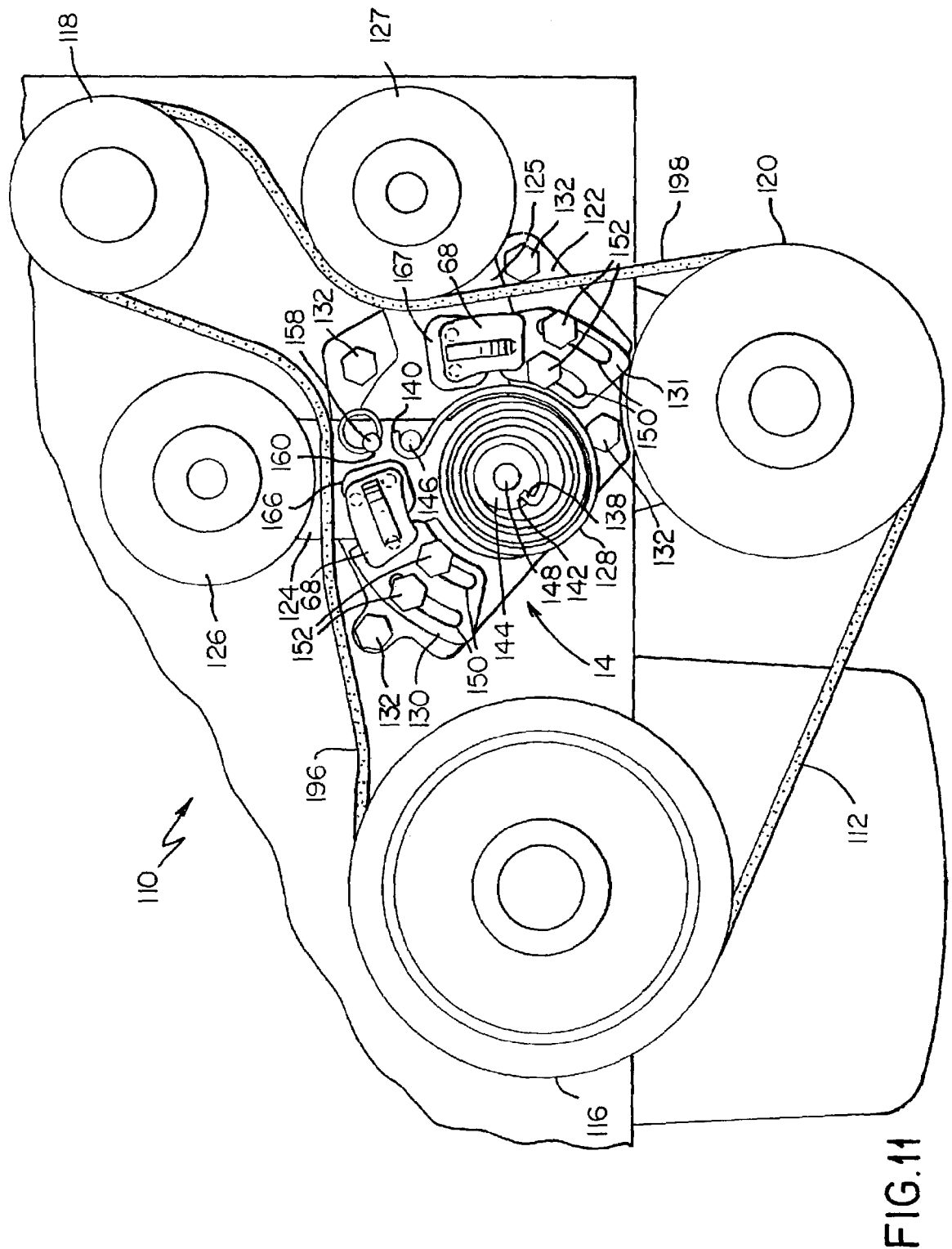
FIG. 11 is a front view of a section of an automobile engine having the tensioner of FIG. 7 in a pre-installed state wherein the belt is untensioned.

Referring to FIG. 11, which depicts a tensioner 114 during installation before the belt 112 is tensioned, the first stop 130 may be linked to the first arm 124 for movement therewith. Specifically, the first stop 130 may be linked to the first arm 124 using the removable link 68, thereby securing the first stop 130 in predetermined position relative to the first arm 124. As described herein the removable link 68 may have a first protrusion 70 which is received in a recess 174 in the arm 124 and a second protrusion 72 which is received in a recess 176 in the first stop 130. Additionally, the removable link 68 may be sized so as to position the first stop 130 at a predetermined desirable distance from the first arm 124 when the first protrusion 70 is received in the recess 174 in the first arm 124 and the second protrusion 72 is received in the recess 176 in the first stop 130. Likewise, the second stop 131 may be linked to the second arm 125 for movement therewith by means of another removable link 68. The step of linking the first and second stops 130, 131 to the first and second arms 124, 125 respectively may be performed by a manufacturer before shipment of the tensioner 114 to an installer.

In another step, the base 122 may be secured relative to a first sheave 116, which may be a driving sheave, and a second sheave 118, which may be a driven sheave, about which the belt 112 moves. In particular, the base 130 may be secured to the engine 110 using bolts 132 in a position such that the tensioner 114 may tension the belt 112 in a first span 196 and a second span 198. The first span 196 may be located between the driving sheave 116 and the first driven sheave 118. The second span 198 may be located between the first driven sheave 118 and the second driven sheave 120. If the engine 110 does not include a second driven sheave 120, the second span may be located between the first driven sheave 118 and the driving sheave 116.

While the first stop 130 is linked to the first arm 124, the first pulley 126 may be moved relative to the base 122 and into engagement with the belt 112. This step may require the installer to align the untensioned belt with the first pulley 126. As a result of spring-biasing, the first arm 124, to which the first pulley 126 is attached, may exert a force on the belt 112 through the first pulley 126 to generate a static tension in the belt 112. When the first pulley 126 and first arm 124 are generating a static tension in the belt 112 the first arm 124 is in a static equilibrium position, the location of which may be set by the spring 128. As a result of having been linked to the first arm 124 in a previous step, the first stop 130 may be automatically located in a predetermined position relative to the static equilibrium position of the arm upon moving the first pulley 126 relative to the base 122 into engagement with the belt 112. Accordingly, the position of the first stop 130 on the base 122 may be automatically adjusted to a desired position by the spring 128 during installation.

Similarly, while the second stop 131 is linked to the second arm 125, the second pulley 127 may be moved relative to the base 122 and into engagement with the belt 112. As a result of spring-biasing, the second arm 125, to which the second pulley 127 is attached, may exert a force on the belt 112 through the second pulley 127 to generate a static tension in the belt 112. When the second pulley 127 and second arm 125 are generating a static tension in the belt 112 the second arm 125 is in a static equilibrium position, the location of which may be set by the spring 128. As a result of having been linked to the second arm 125 in a previous step, the second stop 131 may be automatically located in a predetermined position relative to the static equilibrium position of the arm upon moving the second pulley 127 relative to the base 122 into engagement with the belt 112. Accordingly, the position of the second stop 131 on the base 122 may be automatically adjusted to a desired position by the spring 128 during installation.

After moving the first pulley 126 into engagement with the belt 112, the first stop 130 may be secured to the base 122. Referring to FIG. 7 the first stop 130 may be secured to the base 122 using one or more retaining bolts 152. As previously described, the spring 128, which biases the first arm 124 in a first direction toward the second arm 125, may automatically set the static equilibrium position of the first arm when the first pulley 126 is engaged with the belt 112. Moreover, as a result of the first stop 130 having been linked to the first arm 124, the spring 128 may simultaneously adjust the position of the first stop 130 when the first pulley 126 is engaged with the belt 112. Accordingly, upon engaging the first pulley 126 with the belt 112, the first stop 130 is automatically positioned in a desired location and may be secured to the base 122 to limit the movement of the first arm 124 in a second direction away from the second arm 125.

Similarly, after moving the second pulley 127 into engagement with the belt 112, the second stop 131 may be secured to the base 122. Referring to FIG. 7 the second stop 131 may be secured to the base 122 using one or more retaining bolts 152. As previously described with respect to the first arm 124, upon engaging the second pulley 127 with the belt 112, the second stop 131 may be automatically positioned in a desired location and may be secured to the base 122 to limit the movement of the second arm 125 in the first direction away from the first arm 124.

In another step, after moving the first pulley 126 into engagement with the belt 112, the first stop 130 may be released from the first arm 124 by removing the removable link 68, thereby permitting movement of the first arm 124 relative to the first stop 130. The first stop 130 may be released from the first arm 124 either before or after the first stop 130 is secured to the base 122 provided that the first stop 130 is not otherwise moved after its position has been automatically set by the spring 128. The first stop 130 may be released by removing the removable link 68.

Likewise, after moving the second pulley 127 into engagement with the belt 112, the second stop 131 may be released from the second arm 125 by removing the removable link 68, thereby permitting movement of the second arm 125 relative to the second stop 131. The second stop 131 may be release from the second arm 125 either before of after the second stop 131 is secured to the base 122 and either before or after the first stop 130 is released from the first arm 124.

In another aspect, the method may also include the following additional steps. Referring to FIG. 11, before securing the base 122 relative to the first sheave 116 and the second sheave 118, the arms 124, 125 may be locked to prevent movement of the arms 124, 125 relative to the base 122. This step may be performed by the manufacturer before shipment of the tensioner 114 to the installer. The first and second arms 124, 125 may be locked by inserting a locking member 158 through an aperture 160 in the first arm 124, through an aligned aperture 161 in the second arm 125, and into an aligned aperture 162 in the base 122. The apertures 160, 161 in the first and second arms 124, 125 may be specially positioned so that when the apertures 160, 161, 162 are aligned and the locking member 158 is received in the apertures 160, 161, 162 the arms 124, 125 will be locked in a predetermined position to allow for easy installation. Specifically, the arms 124, 125 may be locked in a position such that when the base 122 is secured to the engine 110, the belt may be easily moved or aligned for engagement with the driving sheave 116, the first driven sheave 118, the second driven sheave 120, the first pulley 126, and the second pulley 127. Before moving the first and second pulleys 126, 127 relative to the base 122 to tension the belt 112, the arms 124, 125 may be unlocked by removing the locking member 158 from the apertures 160, 161, 162.

In another embodiment, the arms 124, 125 may be locked to prevent movement of the first arm 124 relative to the second arm 125 during installation. This step may be performed during assembly by the manufacturer before shipment of the tensioner 114 to the installer. The first and second arms 124, 125 may be locked by inserting the locking member 158 through the aperture 160 in the first arm 124 and an aligned aperture 161 in the second arm 125. The apertures 160, 161 in the first and second arms 124, 125 may be specially positioned so that when the apertures 160, 161 are aligned and the locking member 158 is received in the apertures 160, 161 the arms 124, 125 will be locked in a predetermined position relative to one another to allow for easy installation. Specifically, the arms 124, 125 may be locked in an "open" position, wherein the spring 128 is pre-loaded, such that when the base 122 is secured to the engine 110, the untensioned belt may be easily moved or aligned for engagement with the driving sheave 116, the first driven sheave 118, the second driven sheave 120, the first pulley 126, and the second pulley 127. Before moving the first and second pulleys 126, 127 into engagement with the belt 112 to tension the belt 112, the arms 124, 125 may be unlocked by removing the locking member 158 from at least one of the apertures 160, 161.

For purposes of illustration, the operation of the multiple-arm tensioner 114, according to one aspect, during several exemplary transient events may be summarized as follows. Referring to FIG. 7, during startup of the engine 110, before the crankshaft is moving, the first driven sheave 118, which may be connected to an automotive accessory such as an alternator/starter (not shown), may be driven by the accessory, rather than the belt, in a clockwise direction, which may dramatically increase the tension in the first span 196 of the belt 112 causing the belt 112 to lift the first pulley 126 in the second direction, away from the second arm 125. The movement of the first pulley 126 and first arm 124 in the second direction may be resisted by the spring 128 and the first bushing 164 and may be halted when the first reaction pad 166 contacts the first stop 130. As the tension in the first span 196 of the belt 112 increase, the tension in the second span 198 of the belt 112 correspondingly decreases. Accordingly, the second arm 125 and second pulley 127 may move in the second direction, toward the belt 112 to tension the second span 198 of the belt 112 until the transient event is over.

In another transient event, a tire of the vehicle may hit a curb during a parking maneuver or a driver may hold a steering wheel at its maximum travel limit which may cause the power steering device, which may be connected to the second driven sheave 120, to take on an extremely high load. Such an even may cause the tension in the span of belt located between the driving sheave 116 and the second driven sheave 120 to dramatically increase, thereby causing the first and second spans 196, 198 of the belt 112 to slacken. During such an event, the first arm 124 may move in the first direction to tension the first span 196 of the belt 112, and the second arm 125 may move in the second direction to tension the second span 198 of the belt 112. When the transient event is over, the first and second arms 124, 125 may move back to their steady state positions.

In another transient event the gear system of the vehicle may shift from first to second gear. Such an event may result in a large reverse torque on the crankshaft, which may be connected to the driving sheave 116, as the engine 110 slows down from approximately 6000 rpm to approximately 3000 rpm. By contrast, the first driven sheave 118, as a result of its rotational momentum may not decelerate as quickly as the driving sheave 116, thereby causing a dramatic increase in the tension in the first span 196 of the belt 112. The increase in tension in the first span 196 may cause the belt 112 to lift the first arm 124 in the second direction. Movement of the first arm 124 in the second direction may be resisted by the spring 128 and the first bushing 164 as the first bushing 164 is compressed between the first arm 124 and the first stop 130. When the first reaction pad 166 contacts the first stop 130 the movement of the first arm 124 in the second direction will be halted. Lifting of the first arm 124 due to increased tension in the first span 196 may cause the second span 198 of the belt 112 to slacken. As a result, the second arm 125 may move in the second direction toward the belt 112 as urged by the spring 128 to tension the second span 198 of the belt 112. The second arm 125 and second pulley 127, which engages the belt 112, may continue to tension the second span 198 until the transient event is over.

Referring to FIG. 8, in another aspect the tensioner 114 may further include a mounting bolt 180 to movably attach the spring 128, the first arm 124, and the second arm 125 to the base 122. The mounting bolt 180 may be inserted through: an opening in a cover plate 182, an opening in a first washer 184, an opening in the spring 128, an opening in a second washer 186, an opening the first arm 124, an opening in a third washer 188, an opening 190 which extends through the hub 144 of the second arm 125, an opening in a fourth washer 192, and finally into an opening in the shaft 148 which extends from the base 122. The opening in the shaft 148 may comprise a threaded interior surface to fixedly receive a threaded exterior surface of the mounting bolt 180. All of the openings may be aligned along line 194 during assembly. The first washer 184 may be positioned between the cover plate 182 and the spring 128 to reduce biding of the spring 128. The second washer 186 may be positioned between the spring 128 and the first arm 124 to reduce binding of the spring 128. The third washer 188 may be positioned between the first arm 124 and the second arm 125 to reduce friction and permit movement of the first arm 124 relative to the second arm 125. The fourth washer 192 may be positioned between the second arm 125 and the base 122 to reduce friction and permit movement of the second arm 125 relative to the base 122. The spring 128 may be lined with TEFLON® tape to reduce binding. The washers 184, 186, 188, 192 may be made of plastic.

What is claimed is:

1. A tensioner for generating tension in a power-transmitting belt, the tensioner comprising:
   a base;
   an arm movably attached to said base;
   a pulley rotatably attached to said arm for engaging the belt;
   a spring operatively connected to said arm and said base for urging said arm to move relative to said base in a first direction, thereby urging said pulley into engagement with the belt with a force to tension the belt; and
   a stop linked to said arm and said base, said stop configured for movement relative to said base to automatically position said stop on said base by said spring and said arm at a position during installation of the tensioner, said stop configured to be fixed to said base at said position to limit the movement of said arm in a second direction, said stop moveably linked to said base at a location spaced from said arm.

2. The tensioner of claim 1 wherein said stop is linked to said arm using a removable link to position said stop relative to said arm.

3. The tensioner of claim 2 wherein said arm includes a first and second end and is pivotably attached at said first end to said base, said arm being pivotally attached to said base at a location spaced from the location said stop is moveably linked to said base.

4. The tensioner of claim 3 wherein said pulley is rotatably attached to said second end of said arm.

5. The tensioner of claim 4 wherein a first end of said spring is operatively connected to said arm and a second end of said spring is operatively connected to said base for urging said arm to pivot relative to said base in said first direction.

6. The tensioner of claim 5 wherein said spring is a spiral spring.

7. The tensioner of claim 5 wherein said base is designed to be attached to an associated engine.

8. The tensioner of claim 2 further comprising a locking member, wherein said arm and said base each include an aperture for receiving said locking member.

9. The tensioner of claim 8 wherein said locking member is received in said aperture in said arm and said aperture in said base during assembly of the tensioner and is removed from said apertures during installation of the tensioner.

10. The tensioner of claim 2 further comprising a bushing located between said arm and said stop for resisting the movement of said arm in said second direction, said bushing exerting a resistive force when compressed between said arm and said stop.

11. The tensioner of claim 10 wherein said arm includes a reaction pad positioned to interact with said stop to limit the movement of said arm in said second direction.

12. The tensioner of claim 11 wherein said reaction pad is shaped to receive said bushing and said bushing is received in said reaction pad in a position between said reaction pad and said stop.

13. The tensioner of claim 12 wherein said bushing has a non-linear spring rate.

14. The tensioner of claim 12, wherein the tensioner provides a non-linear resistance to movement of said arm in said second direction, the non-linear resistance including a first resistance range and a second resistance range, the first resistance range generated by said spring, the second resistance range generated by said spring and said bushing when said bushing is compressed between said reaction pad and said stop.

15. The tensioner of claim 12 wherein said removable link includes a first protrusion and a second protrusion, wherein said arm includes a recess for receiving said first protrusion and said stop includes a recess for receiving said second protrusion.

16. The tensioner of claim 15 wherein said recess in said arm is located in said reaction pad.

17. The tensioner of claim 15 wherein said removable link is sized to position said arm at a predetermined distance from said stop when said first protrusion is received in said recess in said arm and said second protrusion is received in said recess in said stop, the removable link being removed during installation of the tensioner.

18. A method of installing a tensioner for generating tension in a power-transmitting belt as the belt traverses a first sheave and a second sheave, the tensioner including a base, a spring-biased arm movably attached to the base, a pulley rotatably attached to the arm for engaging the belt, and a stop, the method comprising the steps of:
  (a) movably linking the stop to the base at a location spaced from the arm;
  (b) linking the stop to the spring-biased arm for movement therewith, the stop thereby being located in a predetermined position relative to the arm;
  (c) securing the base relative to the first sheave and second sheave;
  (d) while the stop is linked to the arm, moving the pulley relative to the base and into engagement with the belt;
  (e) securing the stop to the base after moving the pulley into engagement with the belt, the stop thereby positioned to limit the movement of the arm in a direction away from the belt;
  (f) releasing the stop from the arm after moving the pulley into engagement with the belt, thereby permitting movement of the arm relative to the stop.

19. The method of claim 18 wherein the stop is linked to the arm in step (b) using a removable link.

20. The method of claim 18 further comprising the steps of:
  (g) before securing the base relative to the first sheave and the second sheave, locking the spring-biased arm to the base; and
  (h) before moving the pulley relative to the base, unlocking the arm.

21. The method of claim 20 wherein in step (g) the arm is locked in a predetermined position to allow for easy positioning of the belt for engagement with the first sheave, the second sheave, and the pulley when the base is secured relative to the first sheave and the second sheave.

22. A tensioner for generating tension in a power-transmitting belt, the tensioner comprising:
  a base;
  a first arm movably attached to said base;
  a second arm movably attached to said base;
  a first pulley rotatably attached to said first arm for engaging a first span of the belt;
  a second pulley rotatably attached to said second arm for engaging a second span of the belt;
  a spring operatively connected to said first arm and said second arm for urging said first arm in a first direction toward said second arm and urging said second arm in a second direction toward said first arm, thereby urging said first pulley and said second pulley into engagement with said first span and said second span of the belt respectively with a force to tension the belt;
  a first stop linked to said first arm such that said first stop is automatically positioned on said base by said spring and said first arm during installation of the tensioner, said first stop positioned on said base to limit the movement of said first arm in said second direction away from said second arm; and
  a second stop linked to said second arm such that said second stop is automatically positioned on said base by said spring and said second arm during installation of the tensioner, said second stop positioned on said base to limit the movement of said second arm in said first direction away from said first arm.

23. The tensioner of claim 22 wherein said first stop is linked to said first arm using a first removable link to position said first stop relative said first arm and said second stop is linked to said second arm using a second removable link to position said second stop relative to said second arm.

24. The tensioner of claim 23 wherein said first arm includes a first end and a second end and is pivotably attached at said first end to said base and said second arm includes a first end and a second end and is pivotably attached at said first end to said base.

25. The tensioner of claim 24 wherein said first pulley is rotatably attached to said second end of said first arm and said second pulley is rotatably attached to said second end of said second arm.

26. The tensioner of claim 25 wherein a first end of said spring is operatively connected to said first arm and a second end of said spring is operatively connected to said second arm for urging said first arm to pivot in said first direction toward said second arm.

27. The tensioner of claim 26 wherein said spring is a spiral spring.

28. The tensioner of claim 26 wherein said base is designed to be attached to an associated engine.

29. The tensioner of claim 23 further comprising a locking member, wherein said first arm and said second arm each include an aperture for receiving said locking member.

30. The tensioner of claim 29 wherein said locking member is received in said apertures in said arms during assembly of the tensioner and is removed from said apertures during installation of the tensioner.

31. The tensioner of claim 30 wherein said base includes an aperture for receiving said locking member.

32. The tensioner of claim 31 wherein said locking member is received in said apertures in said arms and said aperture in said base during assembly of the tensioner and is removed from said apertures during installation of the tensioner.

33. The tensioner of claim 23 further comprising a bushing located between said first arm and said first stop for resisting the movement of said first arm in said second direction, said bushing exerting a resistive force when compressed between said first arm and said first stop.

34. The tensioner of claim 33 wherein said first arm includes a reaction pad positioned to interact with said first stop to limit the movement of said first arm in said second direction.

35. The tensioner of claim 34 wherein said reaction pad is shaped to receive said bushing and said bushing is received in said reaction pad in a position between said reaction pad and said first stop.

36. The tensioner of claim 35 wherein the tensioner provides a non-linear resistance to movement of said first arm in said second direction, the non-linear resistance including a first resistance range and a second resistance range, the first resistance range generated by said spring, the second resistance range generated by said spring and said bushing when said bushing is compressed between said reaction pad and said first stop.

37. The tensioner of claim 35 wherein said first removable link includes a first protrusion and a second protrusion, wherein said first arm includes a recess for receiving said first protrusion and said first stop includes a recess for receiving said second protrusion.

38. The tensioner of claim 37 wherein said recess in said first arm is located in said reaction pad.

39. The tensioner of claim 37 wherein said first removable link is sized to position said first arm at a predetermined distance from said first stop when said first protrusion is received in said recess in said first arm and said second protrusion is received in said recess in said first stop, said first removable link being removed during installation of the tensioner.

40. A method of installing a tensioner for generating tension in a power-transmitting belt as the belt traverses a first sheave and a second sheave, the tensioner including a base, a first spring-biased arm movably attached to the base, a second spring biased arm movably attached to the base, a first pulley rotatably attached to the first arm for engaging a first span of the belt, a second pulley rotatably attached to the second arm for engaging a second span of the belt, a first stop, and a second stop, the method comprising the steps of:
(a) linking the first stop to the first arm for movement therewith, the first stop thereby being located in a predetermined position relative to the first arm;
(b) linking the second stop to the second arm for movement therewith, the second stop thereby being located in a predetermined position relative to the second arm;
(c) securing the base relative to the first sheave and the second sheave;
(d) while the first stop is linked to the first arm, moving the first pulley relative to the base and into engagement with the first span of the belt;
(e) while the second stop is linked to the second arm, moving the second pulley relative to the base and into engagement with the second span of the belt;
(f) securing the first stop to the base after moving the first pulley into engagement with the first span of the belt, the first stop thereby positioned to limit the movement of the first arm in a direction away from the second arm;
(g) securing the second stop to the base after moving the second pulley into engagement with the second span of the belt, the second stop thereby positioned to limit the movement of the second arm in a direction away from the first arm;
(h) releasing the first stop from the first arm after moving the first pulley into engagement with the first span of the belt thereby permitting movement of the first arm relative to the first stop; and
(i) releasing the second stop from the second arm after moving the second pulley into engagement with the second span of the belt thereby permitting movement of the second arm relative to the second stop.

41. The method of claim 40 wherein the first stop is linked to the first arm in step (a) using a first removable link and wherein the second stop is linked to the second arm in step (b) using a second removable link.

42. The method of claim 40 further comprising the steps of:
(j) before securing the base relative to the first sheave and the second sheave, locking the first arm to the second arm; and
(k) before moving the first and second pulleys into engagement with the belt, unlocking the first arm from the second arm.

43. The method of claim 42 wherein in step (j) said first arm is locked to said second arm in a predetermined position to allow for easy positioning of the belt for engagement with the first sheave, the second sheave, the first pulley, and the second pulley when the base is secured relative to the first sheave and the second sheave.

44. The method of claim 40 further comprising the steps of:
before securing the base relative to the first sheave and the second sheave, locking the first and second arms to the base; and
before moving the first and second pulleys relative to the base, unlocking the first and second arms.

* * * * *